Figure 1:
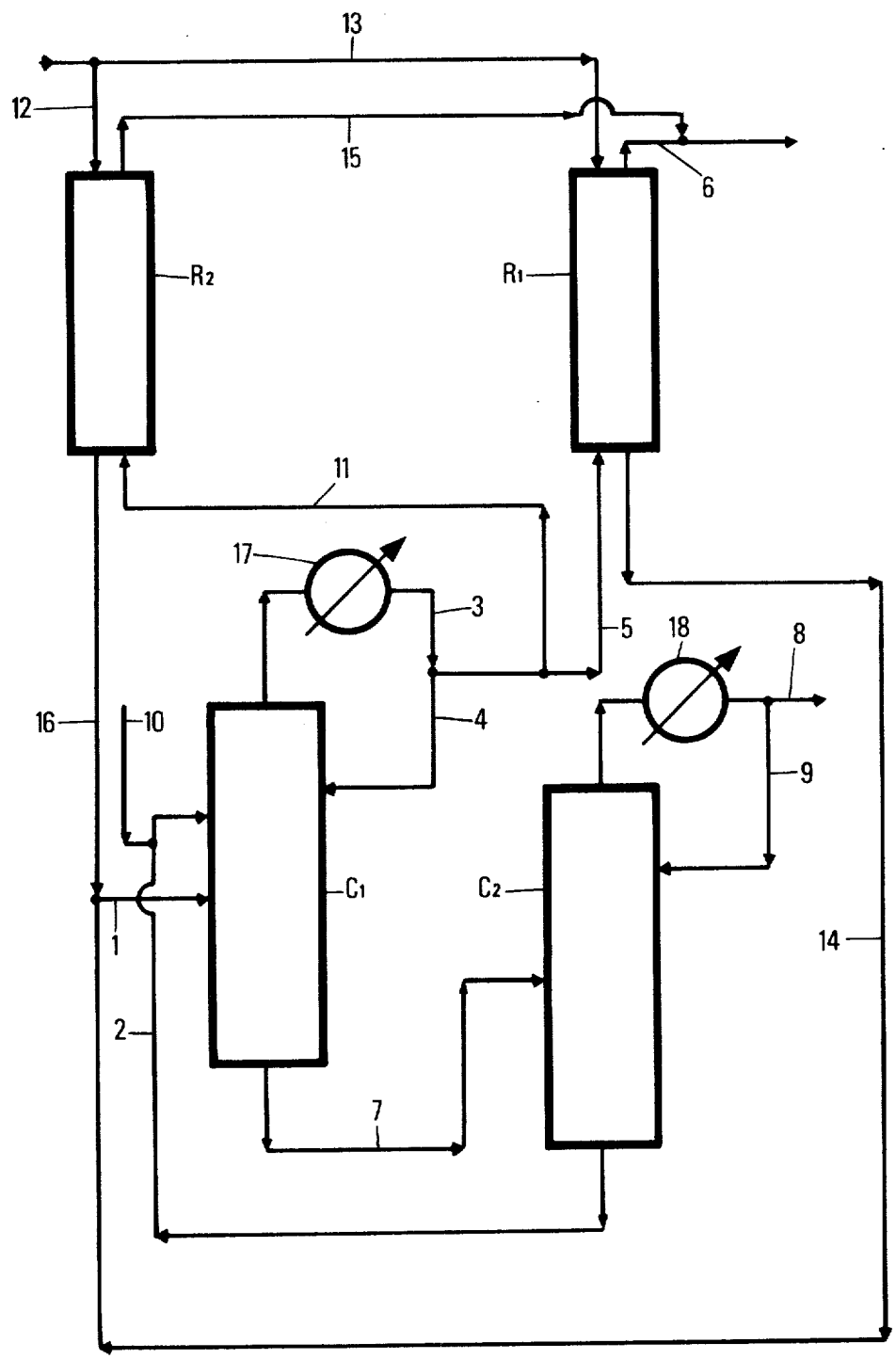

United States Patent

Cohen et al.

[11] 3,919,078
[45] Nov. 11, 1975

[54] PROCESS FOR SEPARATING AROMATIC HYDROCARBONS BY EXTRACTIVE DISTILLATION

[75] Inventors: Georges Cohen, Rueil Malmaison; Francis Gracco, Montesson; Paul Mikitenko, Chatou, all of France

[73] Assignee: Institut Francais du Petrole, Paris, France

[22] Filed: Apr. 5, 1974

[21] Appl. No.: 458,122

[30] Foreign Application Priority Data
Apr. 6, 1973  France ............... 73.12594

[52] U.S. Cl. ............. 208/313; 208/321; 208/330; 260/674 SE
[51] Int. Cl.² ............. C10G 21/20; C10G 21/28
[58] Field of Search ........ 208/313, 321, 229, 305, 208/330, 300; 203/59, 60; 260/674 SE, 676 R; 210/24

[56] References Cited
UNITED STATES PATENTS

| | | | |
|---|---|---|---|
| 2,834,822 | 5/1958 | Worthington et al. | 208/313 |
| 2,964,465 | 12/1960 | Brown et al. | 208/321 |
| 3,409,691 | 11/1968 | Small | 260/677 A |
| 3,428,553 | 2/1969 | Shiah | 208/330 |
| 3,751,507 | 8/1973 | Walker | 260/674 R |

*Primary Examiner*—Herbert Levine
*Attorney, Agent, or Firm*—Millen, Raptes & White

[57] ABSTRACT

Process for separating aromatic hydrocarbons from a mixture further containing non-aromatic hydrocarbons, by extractive distillation in the presence of a polar solvent, giving a non-aromatic distillate and a bottom fraction enriched with aromatic hydrocarbons and containing a major portion of the polar solvent, and followed with a distillation for separating said aromatic hydrocarbons, said process further comprising removing the polar solvent from the non-aromatic distillate by adsorption of said solvent on an ion exchange resin and recovering the polar solvent from the resin by means of an elution agent consisting of at least one hydrocarbon.

13 Claims, 2 Drawing Figures

PROCESS FOR SEPARATING AROMATIC HYDROCARBONS BY EXTRACTIVE DISTILLATION

This invention concerns a process for the separation of aromatic hydrocarbons, particularly benzene and/or toluene, from mixtures containing them with more saturated hydrocarbons, by means of extractive distillation in the presence of a polar compound, particularly dimethylformamide or dimethylacetamide, this process being remarkable in that the polar compound contained in the distillate is recovered by means of ion exchange resins, the further regeneration of which is achieved by contact with hydrocarbons.

The extraction of aromatic hydrocarbons by means of extractive distillation in the presence of a polar compound is a well known process which has been described in many patents; in particular, the compounds from the family of the aliphatic alkyl amides, specially the first terms of said family, dimethylformamide and dimethylacetamide, have prooved to be well adapted to the purification of benzene and/or toluene. Due to their low boiling point, it is possible to operate at relatively low temperatures which are favourable to the efficiency of the separation, the selectivity of the solvent quickly decreasing when the temperature increases.

Moreover, they also have the property of forming azeotropes with saturated hydrocarbons having 6, 7 and 8 carbon atoms and the efficiency of their use in the conventional extractive distillation for purification of benzene and/or toluene is partly compensated by the unavoidable loss of solvent carried away at the top of the column with said saturated hydrocarbons.

The present process provides for the treatment, for example, of benzene and/or toluene fractions issued from reforming products or steam cracking effluents subjected to a preliminar partial hydrogenation, so as to limit the impurities essentially to the saturated hydrocarbons, while avoiding the solvent losses due to the carrying away of the latter with the distillate of the extractive distillation by means of an efficient technique carried out in a simple manner, so as to avoid lengthy and expensive manipulations.

By benzene fraction, we means a mixture of benzene and hydrocarbons whose lower boiling point is at least about 65°C and whose upper boiling point is at most about 102°C. For example, it may be a mixture of benzene and saturated hydrocarbons essentially of from 6 to 8 carbon atoms. However, the process of the invention can also be used for treating benzene fractions containing lighter hydrocarbons.

By toluene fraction, we mean a mixture of toluene with saturated hydrocarbons whose lower and upper boiling points are in the range between the final boiling point of the benzene fraction (about 102°C) and about 120°C.

The present process has the advantage of making it possible, in an efficient and unexpensive manner, to use dimethylformamide and dimethylacetamide, which are remarkable solvents due to their physical and physico-chemical properties, as industrial agents for separating aromatic hydrocarbons from non-aromatic hydrocarbons.

It has now been discovered that benzene and/or toluene can be subjected to extractive distillation under very efficient conditions by recovering the polar compound carried along with the distillate, by means of ion exchange resins, having the property of selectively retaining the polar molecules of the mixture with which they are contacted, said ion exchange resin being regenerable by means of any hydrocarbon solvent.

According to the invention, pure benzene and/or toluene are obtained from mixtures containing them together with paraffinic or cyclanic, branched or unbranched, saturated hydrocarbons by subjecting said mixtures to distillation in the presence of a polar solvent, particularly dimethylformamide or dimethylacetamide, and contacting the distillate with an ion exchange resin so as to remove the polar solvent therefrom, said solvent being subsequently recovered by contacting the resin with any hydrocarbon solvent.

The resins which can be used according to the invention, are, for example, ion exchange resins of the cationic or anionic type, with a macroporous structure or of the gel type.

The resins are prepared from cross-linked polymers, for example, of the polystyrene, polyacrylic, polymethacrylic or phenol-formaldehyde types, forming a matrix to which are incorporated acid or basic groups. They have active groups, more often of the sulfonic, phosphoric, phosphonic or carboxylic type, or amine, trimethylammonium, dimethylethanolamine or quaternary ammonium groups, for example.

We use resins of the cationic type in their acid form or so-treated that the exchangeable ion substituted to proton H$^+$, is a metal cation selected from those of groups IA, IB or VIII of the periodic classification of the elements or an ammonium or alkylammonium cation.

Good results have been achieved in particular when using potassium, silver, cobalt, NH$^+_4$ or alkylammonium cations.

By alkylammonium cations, we mean groups of the formula:

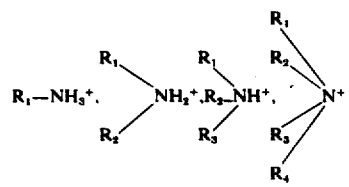

in which R$_1$, R$_2$, R$_3$, R$_4$ are selected from any paraffinic or cyclanic hydrocarbon radicals or hydrocarbon radicals containing, for example, oxygen such as: -CH$_2$OH, -CH OH-R, R-CO-R'-, R-CO$_2$-R'-, R-O-R'-,

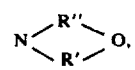

R being a monovalent hydrocarbon radical and R' and R'' being divalent hydrocarbon radicals either identical to or different from each other.

The anionic resins are used in their hydroxide form or in the form of salts such as halides, sulfates, sulfites, carbonates, nitrates, phosphates, carboxylates, chromates or borates, for example.

The ion exchange capacity of these resins is of from 0.1 to 6 equivalents per liter of resin and their divinylbenzene cross-linking rate is from a few % to 20%, preferably from 4 to 12%.

We obtain a quick fixation of the polar molecules and an easy desorption, particularly when using resins of macroporous structure whose specific surface is very high, higher than 20 m²/g and generally from 300 to 800 m²/g.

Interesting results have also been obtained by use of resins whose physical structure is of the gel type, having a small specific surface.

Furthermore it has been observed that, when the rate of saturation of the resins has been reached, a mere washing with a hydrocarbon stream is sufficient for restoring the capacity of the resin to retain the polar molecules. The regeneration is carried out when the distillate has a content of polar compound higher than a defined value.

We can use, as elution agent, any hydrocarbon i.e. light or heavy, branched or unbranched, paraffinic, cyclanic or aromatic hydrocarbons, separately or as contained in a hydrocarbon cut, preferably having a narrow distillatioin range.

In the particular case described, a simple and practical manner for carrying out said regeneration consists of making use, as elution agent, of the benzene or toluene cut subjected to the extractive distillation since it has the required characteristics.

This step is conducted at a moderate temperature, generally, in a practical manner, at room temperature, but a lower or higher temperature may be convenient provided it is compatible with the physical properties of the hydrocarbons contained in the elution agent which must be kept in the liquid state.

The step of fixation of the polar molecules is carried out by passing through said resins the distillate from the extractive distillation containing saturated hydrocarbons, a small amount of aromatic hydrocarbons and a polar compound so as to recover an effluent consisting essentially of hydrocarbons.

The efficient flow rates may be up to 10 to 50 times the bed volume per hour and the amount of distillate subjected to the treatment is advantageously in a ratio by weight, with respect to the resin of from 1:1 to 100:1 and, preferably from 1:1 to 50:1.

The described resins have a very remarkeable selectivity with respect to the polar compounds and their effect is sufficient for making it possible, in an easy and quick manner, to remove the polar compound contained in the distillate from such an extractive distillation, at rates generally close to 0.5 to 10% by weight, and obtain a residual concentration of only a few parts per million.

As used in the process the resins may be anhydrous or contain a substantial amount of water.

For having them anhydrous i.e. with a water content lower than 0.2% by weight, they are, for example, subjected to drying under vacuum.

The treatment of the distillate carried out on wet resins, gives very good results, similar to the treatment with anhydrous resins, the presence of water being not detrimental to the capacity and the selectivity of the resins towards the polar solvents.

We have obtained good performances by using resins containing hydration water, i.e., for example, a resin XE 284 (Rohm and Haas) which may contain up to 30% by weight of water. The water which may be contained in the distillate and results from the feeding of the extractive distillation column with a wet benzene and/or toluene cut, is then recovered in the effluent obtained after passage on the resin. These cuts, as a matter of fact, may contain small amounts of water which are less than 1% by weight, generally close to 0.05%.

It has been observed that the use of anhydrous or slightly hydrated resins has a dehydration effect on the stream with which it was contacted up to the accumulation of a water amount corresponding to 13 to 14% by weight of the resin. After that, the resin becomes inactive towards water and continues to retain the polar compound until its capacity toward the latter is attained. Experiments have shown that the capacity of the resin is improved in the presence of its hydration water.

The process may be carried out in the following manner:

We introduce the mixture to be separated at an intermediary point of a distillation zone and the polar solvent at a point of said zone above the point of introduction of the hydrocarbon mixture; we condense the top product from the distillation zone, or distillate, before contacting it with anion exchange resin for obtaining a liquid effluent containing only hydrocarbons, which is removed from the circuit; we discharge the bottom product from the distillation zone which contains the aromatic hydrocarbons and the polar solvent which is subsequently separated in a known manner, generally by distillation, for obtaining, on the one hand, the aromatic hydrocarbons which are separated and, on the other hand, the polar solvent which is recycled to the distillation column.

When it is observed that the capacity of the ion exchange resin has been reached, the regeneration of the resin is performed, i.e. the solvent fixed on the resin bed is removed.

According to a preferred embodiment, the efficiency of the fractionation is increased by sending to the distillation column, as reflux, a portion of the distillate condensed at the top of the column, the other portion being merely withdrawn. The point of introduction of said reflux is preferably above the point of introduction of the solvent.

The process of the invention has a very significant advantage resulting from the use of the mixture of hydrocarbons to be separated for regenerating the resin. It is thus possible to avoid any external supply of product which would require a separation step always expensive and to avoid solvent losses. It suffices to pass the mixture of hydrocarbons to be separated through the column containing the ion exchange resin which was precedingly used for removing the polar compound from the distillate; the resulting product, carrying therewith the polar solvent, can be used without inconvenience as the charge introduced into the extractive distillation zone.

The continuous operation of the extractive distillation column implies the use of two columns filled with resins and operated alternately, one in the stage of fixation while the other is in the stage of regeneration. The invention is, however, not limited to the use of two such columns and the use of the hydrocarbon charge from the extractive distillation as elution agent is not limitative of the scope of the invention.

A particularly interesting use of the invention concerns the extractive distillation of benzene and/or toluene cuts by means of dimethylformamide or dimethylacetamide since the solvent is carried along by azeotropy with the saturated hydrocarbons which constitute the distillate, particularly with the hydrocarbons having seven carbon atoms. The prevailing conditions are favourable to the use of ion exchange resins since the hydrocarbon mixtures to be treated contain, according to the mode of operation of the extractive distillation column, from 0.5 to 10% of polar solvent and more usually from 1 to 6% of said solvent. However, the invention can be used for the removal of any other polar solvent commonly used for carrying out extractive distillations of hydrocarbon compounds which may be different from benzene and/or toluene. We may mention, for example, N-methylpyrrolidone, methylmorpholine, sulfolane, dimethylsulfoxide, furfural and, more generally, any polar solvent which is used as extraction agent.

The diagram shown in FIG. 1 illustrates, in a non-limitative manner, the operation of the installation.

This installation consists of an extractive distillation column C 1, a distillation column C 2 and two identical columns R 1 and R 2 containing ion exchange resins; the column R 1 is on stream while R 2 operates in a regeneration stage.

We introduce into the column C 1 the mixture to be separated from line 1 and dimethylformamide (DMF) from line 2. The top fraction of the distillation passes through line 3; it is condensed in exchanger 17; a portion thereof is recycled as reflux through line 4 and the other portion, passed through line 5, is sent to column R 1. We recover, from line 6, a fraction consisting of the non-aromatic hydrocarbons of the starting mixture.

Simultaneously we recover from line 7 a fraction containing essentially DMF and benzene and/or toluene which is sent to column C 2 in order to be separated into its constituents. We recover from line 8, after passage through the condenser 18, a distillate consisting of practically pure benzene and/or toluene (the reflux occurs through line 9) and, at the bottom of the column, we recover the DMF which returns to the column C 1 through line 2. A supply of DMF can be provided through line 10.

When it is observed that the polar solvent content of the fraction recovered through line 6 reaches a maximum limit, column R 1 is then taken off stream and regenerated. Thus, the valves (not shown) placed on lines 5, 6, 12 and 16, are closed.

The distillate from column C 1 is then conveyed through line 11 to the column R 2 placed on the line 15 and through which was precedingly conveyed the mixture to be treated which was introduced through line 12. This mixture is now conveyed through line 13 to column R 1 from where it flows out through line 14, after having displaced the polar molecules retained by the resin, for joining the line 1 from where it is introduced without inconvenience into column C 1.

Meanwhile, we recover from line 15, a distillate free of DMF, identical to that recovered from line 6.

When the column R 2 is operated in a regeneration stage, the mixture to be treated, which is introduced into column C 1 through line 1 also contains DMF. The valves of ducts 5, 6, 12 and 16 are then opened, those of ducts 11, 13, 14 and 15 are closed.

If so desired, we can use a portion of the hydrocarbon charge to be distilled as resin eluting agent.

The system of pumps, heating of the columns, cooling of the column heads, necessary for the operation of the installation have not been shown on the diagram.

After each passage of hydrocarbons through the resin bed, said resin bed is still impregnated with the hydrocarbons with which it has just been contacted.

At the end of each regeneration stage, for example, which is preferably performed by using the extractive distillation charge, rich in aromatic hydrocarbons, for example benzene, the resin is still impregnated by this mixture of hydrocarbons of high aromatic content. The passage to the stage of fixation (adsorption of the polar compound contained in the distillate) with direct discharge from the unit of the fixation effluent will consequently result in a slight loss of aromatics, said loss being the more important in absolute value as the resin bed is more bulky.

In order to avoid this slight loss, which is nevertheless detrimental to the total yield of the operation, we may recycle to the extractive distillation column the first fraction of the fixation effluent. The volume of said fraction is specific for each problem; it is generally from 1 to 3 times the volume of the resin bed.

Figure 2:
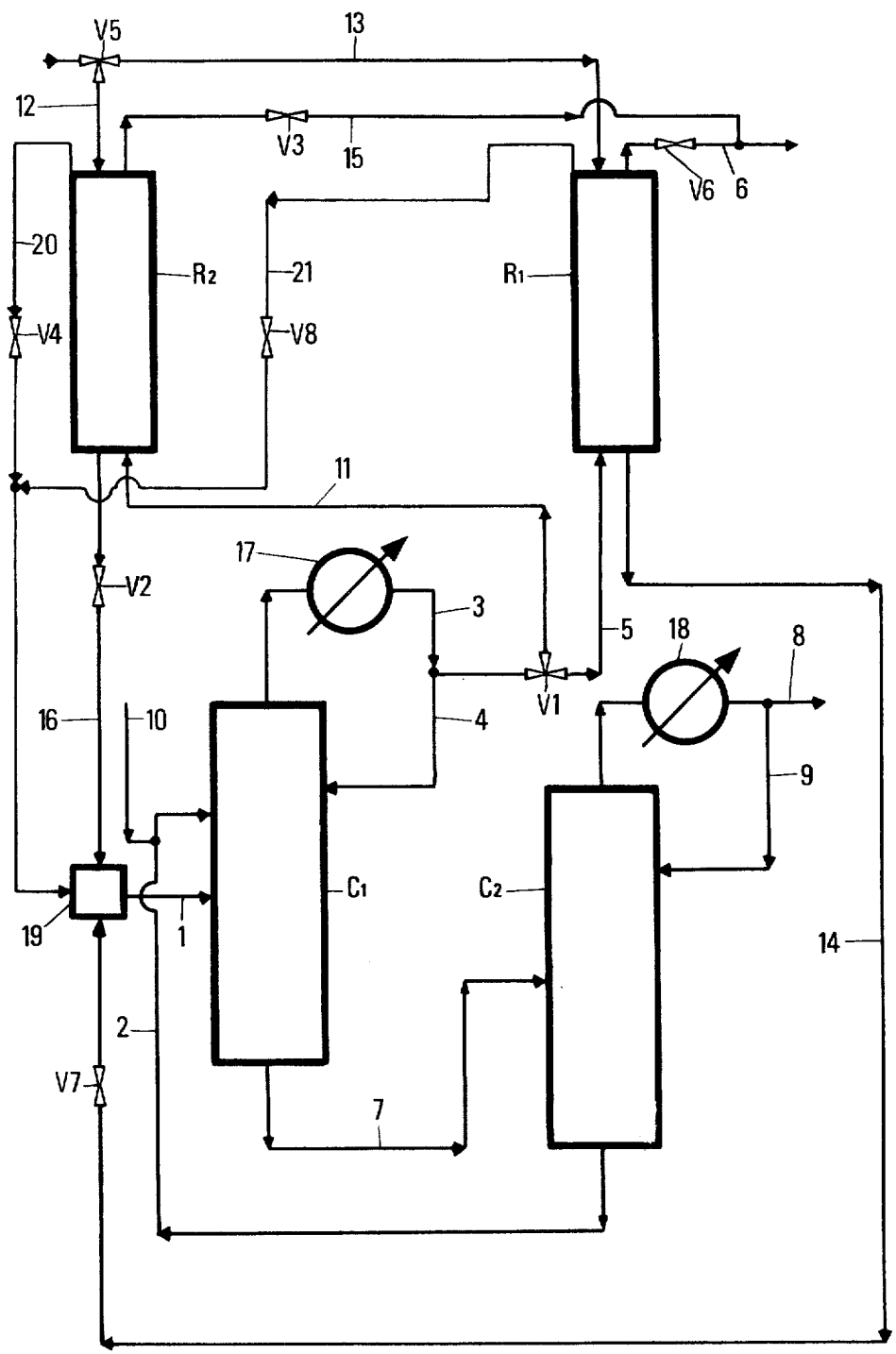

FIG. 2 illustrates an embodiment of the invention corresponding to this particular case.

FIG. 2 is similar to FIG. 1 except for the following points: a storage tank 19 and two ducts 20 and 21 connected to this tank, have been added. Moreover, for sake of clarity of the diagram, the valves $V_1$ to $V_8$ have been shown.

The operation is as follows:

First stage

The resins from column R 2 retain the polar solvent contained in the distillate of column C 1, said distillate being subsequently conveyed to the unit outlet (line 15).

The resins from column R 1 are regenerated by a fraction of the aromatic charge, supplied from line 13. Said fraction, carrying therewith the polar solvent precedingly retained by the resin, is conveyed through line 14 to the tank 19. A pump conveys this mixture through line 1 toward the extractive distillation column.

Second stage

The resins from column R 2 are counter-currently scavenged with the aromatic charge. The residual distillate is carried away towards the tank 19 through line 16.

The resins from column R 2 are counter-currently scavenged with a distillate charged with solvent. The residual aromatics are thus carried away toward the tank 19 through line 21.

Third stage

This stage is similar to the first one except that the operations of the columns are reversed; the column R 2 being regenerated by the charge while the column R 1 adsorbs the solvent from the distillate.

Fourth stage

This stage is identical to the second stage except that the operations of the columns are reversed; the column R 2 is washed by the distillate introduced through line 11 and discharged through line 20, while the column R 1 is traversed by the aromatic charge.

The mode of operation of the unit is indicated in the following table:

|          | V1*   | V2     | V3     | V4     | V5*   | V6     | V7     | V8     |
|----------|-------|--------|--------|--------|-------|--------|--------|--------|
| 1st stage | 3–11 | closed | open   | closed | 22–13 | closed | open   | closed |
| 2nd stage | 3–5  | open   | closed | closed | 22–12 | closed | closed | open   |
| 3d stage  | 3–5  | open   | closed | closed | 22–12 | open   | closed | closed |
| 4th stage | 3–11 | closed | closed | open   | 22–13 | closed | open   | closed |

*Three-ways valves (the reference numerals of the ducts which are put in communication are mentioned). All the other valves are two-ways valves.

EXAMPLE 1

In accordance with the above-described operating manner, we subject a benzene cut preliminarily dried so as to reduce its water content to less than 0.2% by weight, and containing 70% by weight of benzene and 30% by weight of non-aromatic hydrocarbons (paraffinic and naphthenic hydrocarbons having 6, 7 and 8 carbon atoms and whose boiling points range from about 65 to about 102°C) to an extractive distillation with dimethylformamide (DMF).

The column is of the Oldershaw type, comprising 60 effective plates, and has a diameter of 5 cm.

We introduce the mixture to be treated (line 1) at the level of the 25$^{th}$ plate from the bottom, at a rate of 503 g/h (including 3 g/h of DMF resulting from the resin regeneration), and the DMF at the level of the 55$^{th}$ plate (line 2) at a rate of 1250 g/h. The vapors condensed at the top of the column are fed back to the column as reflux at a rate of 280 g/h and we recover (line 5) 153 g/h of a distillate containing by weight:

99.95% of non aromatic hydrocarbons,
1.98% of DMF, and
0.07% of benzene

From the column bottom, we withdraw (through line 7) a mixture consisting essentially of DMF and benzene in proportions, by weight, respectively close to 78.1% and 21.9%. The amount of non aromatic hydrocarbons carried away is lower than 0.01%.

After passage alternatively through columns (R 1 and R 2), containing each 75 g of resin XE 284 in the anhydrous K form, i.e. having a water content reduced at least to 0.2% by weight after drying under vacuum, we recover (from lines 6 and 15) the non-aromatic hydrocarbons and the benzene from the distillate free from DMF.

After 5 hours of operation in the fixation stage for R 1, and the regeneration stage for R 2, the operating conditions of the two columns of resins are reversed for the next five hours; R 2 will be operated in the fixation stage while R 1 will be regenerated by the flow of the charge.

The mixture recovered from the column bottom (from line 7) is introduced at the middle of the second distillation column of a 2 meters height, formed of Oldershaw elements of a 5 cm diameter. At the top of said second column, we recover benzene at a rate of 700 g/h, one half of which is fed back as reflux and the remaining part forms the production of aromatics (line 8) whose content in non-aromatic hydrocarbons does not exceed 0.02% by weight. From the bottom of the column, we withdraw the DMF which is recycled to the first column.

EXAMPLE 2

Example 1 is repeated but with a feeding of the installation with a benzene cut which is non dried, i.e. having a water content of 0.05% by weight. The flow rate is so adjusted that the supplied amounts of hydrocarbons are the same as in example 1. We obtain the same results except that DMF is present in the effluent recovered after the passage of the distillate through columns R 1 and R 2 after 5 hours and a half of operation. We thus observe an increase of the resin capacity.

EXAMPLE 3

While using the flow sheet of FIG. 2, a benzene cut, preliminarily dried to a water content of less than 0.2% by weight, and containing by weight 70% of benzene and 30% of non-aromatic hydrocarbons (paraffinic and naphthenic hydrocarbons having 6, 7 and 8 carbon atoms and whose boiling points range from about 65° to about 102°C) is subjected to an extractive distillation with dimethylformamide (DMF).

The column is of the Oldershaw type, comprises 60 effective plates and has a diameter of 5 cm. We introduce the mixture to be treated (line 1) at the level of the 25$^{th}$ plate from the bottom, at a rate of 530 g/h (including 3 g/h of DMF issued from the resin regeneration stage) and the DMF at the level of the 55$^{th}$ plate (line 2) at a rate of 1320 g/h. The vapors condensed at the top of the column are fed back to the column, as reflux, at a rate of 295 g/h and we recover (from line 5) 161 g/h of a distillate containing by weight:

97.95% of non aromatic hydrocarbons,
1.98% of DMF,
0.07% of benzene.

From the bottom, we withdraw (line 7) a mixture consisting essentially of DMF and benzene in proportions, by weight, respectively close to 78.1% and 21.9%. The amount of non-aromatic hydrocarbons carried away is lower than 0.01%.

After passage alternatively through columns R 1 and R 2, each containing 75 g of resin XE 284 in the anhydrous K form, i.e. having a water content reduced to less than 0.2% by weight by drying under vacuum, we recover (from lines 6 and 15) the non-aromatic hydrocarbons and the benzene from the distillate freed from the DMF which was contained therein. After five hours of operation, in the fixation stage for R 1 and in the regeneration stage for R 2, the operating conditions of the two resin columns are reversed for the next 5 hours, so that R 2 will be operated in a fixation stage while R 1 will be regenerated by the flow of the charge.

The mixture recovered from the column bottom (through line 7) is introduced at the middle of the second distillation column of a 2 meters height, formed of Oldershaw elements having a 5 cm diameter. At the top of said second column, we recover the benzene at a rate of 738 g/h, one half of which is fed back as reflux and the remaining portion constitutes the production of aromatics (line 8) whose content of non-aromatic hydrocarbons does not exceed 0.02% by weight. From the bottom of the column, wee withdraw the DMF which is recycled to the first column.

The process may be applied to other hydrocarbon mixtures, particularly those containing from 10 to 90% by weight of benzene and/or toluene, the remaining portion consisting essentially of saturated hydrocarbons.

We claim:

1. A process for separating aromatic hydrocarbons from a mixture contining the same together with at least one saturated, paraffinic or cyclanic, branched or unbranched hydrocarbon, by extractive distillation in the presence of an aliphatic alkyl amide polar solvent, comprising separating a top fraction of the distillate, enriched with saturated hydrocarbons and containing a minor proportion of the aliphatic alkyl amide polar solvent and and a bottom fraction enriched with aromatic hydrocarbon and containing a major portion of the aliphatic alkyl amide polar solvent and subjecting the bottom fraction to a distillation for separating the aromatic hydrocarbon from the major portion of the aliphatic alkyl amide polar solvent, said process further comprising contacting the distillate with a ion exchange resin so as to obtain a distillate enriched with saturated hydrocarbon and free from the aliphatic alkyl amide polar solvent and subsequently contacting the resin with an elution agent comprising at least one hydrocarbon so as to displace the aliphatic alkyl amide polar solvent selectively retained thereon.

2. A process according to claim 1, in which the ion-exchange resin is a macroporous resin or a resin of the gel type, exchanging cations or anions.

3. A process according to claim 1, in which the polar solvent is dimethylformamide.

4. A process according to claim 1, in which the polar solvent is dimethylacetamide.

5. A process according to claim 1, in which the elution agent is the hydrocarbon mixture subjected to the extractive distillation.

6. A process according to claim 1, in which the hydrocarbon mixture contains benzene and/or toluene.

7. A process according to claim 1, in which the treated hydrocarbon mixture contains from 10 to 90% by weight of benzene and/or toluene.

8. A process according to claim 1, in which the exchangeable ion of the resin is a proton $H^+$.

9. A process according to claim 1, in which the exchangeable ion of the resin of cationic type is selected from the elements of groups I A, I B and VIII of the periodic classification of elements.

10. A process according to claim 1, in which the exchangeable ion of the resin of cationic type is a $NH_4$ or alkylammonium group.

11. A process according to claim 1, in which the resin of the anionic type is in the hydroxide form or in the form of a salt.

12. A process according to claim 1, in which at least two separate beds of ion exchange resins are used, one of which is contacted with the distillate while the other is contacted with the elution agent.

13. A process according to claim 12, comprising at least four successive stages: a first stage in which the distillate is contacted with the first resin bed and then discharged from the installation, and the hydrocarbon mixture is contacted with the second resin bed and then subjected to the extractive distillation, a second stage in which the hydrocarbon mixture is contacted with the first resin bed and then subjected to the extractive distillation and the distillate is contacted with the second resin bed, said distillate being thereafter subjected to an extractive distillation, a third stage in which the distillate is contacted with the second resin bed and then discharged from the installation and the hydrocarbon mixture is contacted with the first resin bed and then subjected to the extractive distillation, and a fourth stage in which the hydrocarbon mixture is contacted with the second resin bed and subsequently subjected to the extractive distillation, and the distillate is contacted with the first resin bed and thereafter subjected to the extractive distillation.

* * * * *